Patented Mar. 19, 1935

1,994,602

UNITED STATES PATENT OFFICE 1,994,602

PROCESS OF PREPARING VAT DYESTUFFS OF THE ANTHRAQUINONE TRIAZINE SERIES

Franz Wieners, Opladen, Germany, assignor to General Aniline Works, Inc., New York, N. Y., a corporation of Delaware No Drawing. Application June 4, 1931, Serial No. 542,199. In Germany June 4, 1930

6 Claims. (Cl. 260—27)

The present invention relates to a process of preparing vat dyestuffs of the anthraquinone series from halogenated 1.3.5-triazines and aminoanthraquinone compounds.

It is known to prepare vat dyestuffs of the anthraquinone series by reacting upon a chlorinated 1.3.5-triazine compound with an aminoanthraquinone compound.

I have found that this reaction performs in an especially fast and convenient manner when performing it in the presence of an aromatic hydroxy compound, preferably one being liquid at a temperature below about 100° C. Such hydroxy compounds are, for example, phenol, halogenated phenols, such as ortho-, meta-, or para-chlorophenol, para-bromophenol, dichlorophenols, homologues of phenols, such as ortho- meta- or para-cresol etc.

The more detailed method of working may be as follows:—

A chlorinated 1.3.5-triazine compound of the probable formula:—

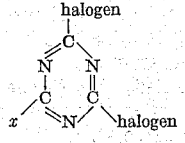

wherein $x$ means halogen or a hydrocarbon radical, it means alkyl, aryl, aralkyl or hydroaryl, is caused to react with the aminoanthraquinone compound (aminoanthroquinones themselves or nuclear substitution products or derivatives thereof) at elevated temperature, preferably at a temperature between about 60 and about 170° C. in the presence of the phenolic compound. The phenolic compound is advantageously applied in an amount sufficient to dissolve at least the greatest part of the reaction components, however, it will likewise be possible, to replace part of the phenolic compound by a suitable organic solvent, such as nitrobenzene, orthodichlorobenzene, glacial acetic acid etc. Lower and higher temperatures than those mentioned above are likewise operable in most cases; however, the temperature ranges given are the preferred ones.

As suitable aminoanthraquinone compounds there may be mentioned in the first place alpha- and beta - aminoanthraquinones, substitution products thereof being substituted in the nucleus by aroylamino groups or halogen atoms, such as 1-amino-4-benzoylaminoanthraquinone, 1-amino-5-benzoylaminoanthraquinone, 1-amino-4- or -5-meta-methoxy - benzoylaminoanthraquinone, 1-amino-6-chloroanthraquinone etc. Other substituted aminoanthraquinones or derivatives of aminoanthraquinones, such as 4-amino-1.1′-dianthraquinonylamine, 4 - aminoanthraquinone - (2′.4′-dichloro)-anthraquinone-2.1-(N)-acridone are likewise operable and will yield satisfactory results.

It is possible to apply the aminoanthraquinone compound in an amount sufficient to replace part or all of the halogen atoms present in the chlorinated 1.3.5-triazine compound applied, but it is a preferred method of working to apply the aminoanthraquinone compound in an amount sufficient to replace all of the halogen atoms of the triazine compound. In this case the resulting dyestuffs can be obtained free from halogen, in consequence of which they are, when dyed on the fibre, fast to alkalies and kier boiling, in contradistinction to many of the corresponding dyestuffs prepared in the absence of a phenolic compound. In many cases these latter dyestuffs still contain halogen and, probably on account of this fact, are not fast to alkalies and kier boiling.

When working in the manner above described, it will, furthermore, be possible to obtain the dyestuffs in question in an especially short time and in a very good state of purity. They yield on cotton very clear and fast shades without being further purified. In this respect the dyestuffs obtained according to my process are also distinguished from the corresponding dyestuffs obtained in the absence of a phenolic compound, since these latter dyestuffs must usually be purified, for example, by means of sodium hypochlorite, to yield clear dyeings.

The following examples illustrate my invention without limiting it thereto, the parts being by weight:—

Example 1

134 parts of alpha-aminoanthraquinone are dissolved in 2000 parts of phenol at 110° C., 37 parts of cyanuric chloride are added and the whole is stirred for 5 hours at 110° C. An abundant quantity of dyestuff separates. The reaction mixture is heated to 150° C. for a further 2–3 hours, and about 2000 parts of pyridine are stirred in, whereupon the dyestuff separates completely. After cooling, the dyestuff is filtered and washed with alcohol. A yellow crystalline powder is thus obtained in a yield exceeding 95% of the theoretical. The dyestuff is free from halogen and contains 11.2% of nitrogen. It dyes cotton from an alkaline hydrosulfite vat of the said dyestuff a very clear golden yellow of excellent fastness properties. By stirring with a solvent at an elevated temperature, the dyestuff is easily obtained in the form of fine, small golden yellow needles. The dyestuff corresponds most probably to the formula:—

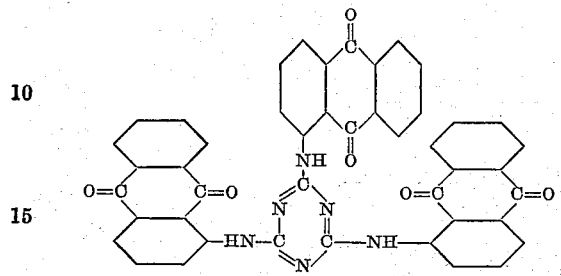

A dyestuff of the same properties is produced when the condensation is carried out in a similar manner in a cresol mixture instead of in phenol.

*Example 2*

134 parts of alpha-aminoanthraquinone are dissolved in about 1400 parts of para-chlorophenol at 100° C., and 37 parts of cyanuric chloride are added. The solution becomes somewhat lighter in color and large quantities of hydrogen chloride gas are evolved. The reaction mixture is stirred for about 45 minutes at 100–110° C., and 1000 parts of alcohol are then run in, whereupon the dyestuff separates in fine, small needles. After cooling it is filtered, washed with alcohol and dried. 141 parts of a dyestuff are thus obtained, being identical with that of Example 1. The dyestuff contains traces of chlorine due to adhering chlorophenol. This can be removed by stirring the dyestuff for a short time with an appropriate solvent while heating.

*Example 3*

69 parts of alpha-aminoanthraquinone are dissolved at 110° C. in 750 parts of molten alpha-naphthol, and 19 parts of cyanuric chloride are added. Large quantities of hydrogen chloride gas escape. After stirring for 2–3 hours at about 110° C., the dyestuff produced begins to separate. About 1000 parts of alcohol are then run slowly into the still warm melt. The dyestuff is thus obtained in beautiful small needles. The yield is very satisfactory. The product is identical with those of Examples 1 and 2.

*Example 4*

38 parts of cyanuric chloride are added at 100° C. to a solution of 134 parts of alpha-aminoanthraquinone in 1340 parts of ortho-chlorophenol, and the whole is stirred for about 4 hours at 100 to 110° C. During the condensation large quantities of dyestuff separate. The ortho-chlorophenol is removed by passing a current of steam through the reaction mixture. The remaining dyestuff is filtered and dried. It can, if necessary, be further purified by stirring it with an appropriate solvent, such as nitrobenzene or quinoline, at an elevated temperature. The product is then very pure and identical in its constitution with those of Examples 1, 2 and 3.

*Example 5*

134 parts of beta-aminoanthraquinone are dissolved in about 2000 parts of molten phenol, and 37 parts of cyanuric chloride are stirred in. The temperature is raised to 150° C. in the course of about two hours, while stirring continuously, and is maintained at that point for a further 3–4 hours. The partially separated dyestuff is completely separated by stirring into the reaction mixture about 2000 parts of alcohol. After cooling, the dyestuff is filtered and washed with alcohol. There is thus obtained in a yield of 95% of the theoretical a yellow powder, free from halogen. It dyes cotton from an orange colored alkaline hydrosulfite vat a powerful yellow of satisfactory fastness properties. The product corresponds most probably to the formula:—

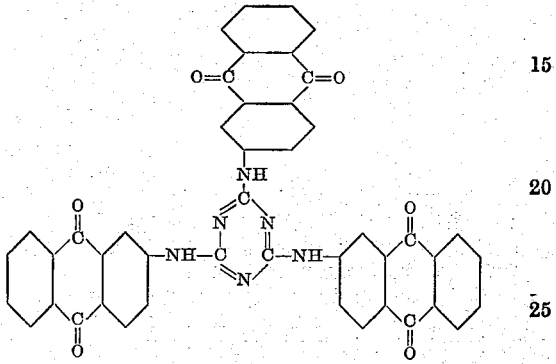

*Example 6*

A mixture of 45 parts of beta-aminoanthraquinone and 90 parts of alpha-aminoanthraquinone is dissolved in 1400 parts of para-chlorophenol at 100° C., and 37 parts of cyanuric chloride are added. The solution becomes lighter in color with a vigorous evolution of hydrogen chloride gas. Already after a few minutes the formation of abundant quantities of dyestuff can be ascertained by precipitation of a test portion with alcohol. The reaction mixture is stirred for 2 hours at 100° C., and the temperature is then raised to 130° C. for about one hour. When 1000 parts of alcohol are then stirred in, the dyestuff separates and can be filtered. It is washed with alcohol and dried. The yellow powder thus obtained is a golden yellow vat dyestuff of very satisfactory fastness properties. It contains most probably two alpha-aminoanthraquinone- and one beta-aminoanthraquinone radical connected with the triazine ring.

*Example 7*

To 51 parts of 1-amino-4-benzoylaminoanthraquinone, dissolved in about 1000 parts of para-chloro-phenol at about 100° C., 9,5 parts of cyanuric chloride are added. The mixture is stirred for 1½ hours at 100–110° C., and 1000 parts of alcohol are then run in. The separated dyestuff is filtered at ordinary temperature, washed with alcohol and dried. By heating it for a short time with ten times the quantity of nitro-benzene, the dyestuff is obtained in small thick red needles on cooling. It dyes cotton from the vat clear red shades of very satisfactory fastness properties.

*Example 8*

30 parts of alpha-aminoanthraquinone are dissolved at 100–110° C. in 500 parts of phenol, 20 parts of phenyl-dichloro-1.3.5-triazine are added and the whole is stirred for 15–20 minutes at 100–110° C. About 500 parts of alcohol are then run in slowly, whereupon the dyestuff separates in needles. The yield nearly corresponds to the theoretical. The dyeings produced with this dyestuff are clear yellow shades of excellent fastness properties. The dyestuff corresponds most probably to the formula:—

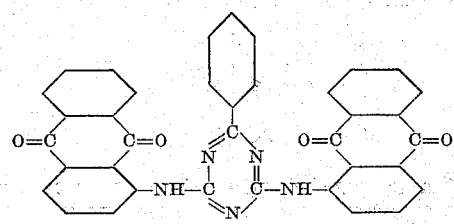

Example 9

50 parts of 4-amino-1.1'-dianthraquinonyl-amine are dissolved at 110° C. in 500 parts of phenol, 15 parts of phenyl-dichlorotriazine are added and the whole is stirred for 2–3 hours at about 115° C. About 500 parts of alcohol are then run in and, after cooling, the condensation product is filtered, washed with alcohol and dried.

There are thus obtained 57.5 parts (=98% of the theoretical yield) of a dark crystalline powder, which by boiling with quinoline, in which it is only slightly soluble, is converted into small needles. The coloration of the solution in sulfuric acid is a clear light green. On pouring this solution into water Corinth colored flakes are obtained.

The condensation carried out in a similar manner in nitrobenzene in the absence of phenol leads to another product, wherein only one chlorine atom of the triazine is replaced by the radical of the amino-dianthraquinonylamine, whereas the reaction product of the above example corresponds most probably to the formula:—

Example 10

40 parts of alpha-aminoanthraquinone are dissolved in 500 parts of phenol at 90° C. After the addition of 16 parts of methyldichloro-1.3.5-triazine, the mixture is stirred for about three quarters of an hour at 100° C. 1000 parts by weight of methyl alcohol are then run in slowly with continuous stirring. The dyestuff formed separates in small light yellow needles. The yellow dyeing produced on cotton from the orange red alkaline hydrosulfite vat of this dyestuff is distinguished by excellent fastness properties.

The dyestuff contains most probably two radicals of the alpha-aminoanthraquinone connected with the triazine ring.

Example 11

45 parts of 4-aminoanthraquinone-1.2.(2'.4'-dichloro)-acridone are introduced, while stirring, into 1400 parts of phenol at 150° C., and 11 parts by weight of methyl-dichloro-1.3.5-triazine are then added. The mixture is stirred for 4 hours at 150 to 160° C., 1500 parts of methyl alcohol are then added, whereupon the dyestuff separates. After cooling, the dyestuff is filtered and washed with methyl alcohol. The dyestuff obtained is, after drying, a blue powder, which can be vatted easily and dyes cotton from the alkaline hydrosulfite vat blue shades of particularly satisfactory fastness to chlorine. The dyestuff corresponds most probably to the formula:—

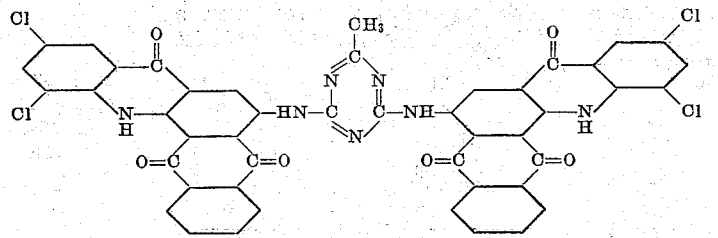

Example 12

To 500 parts of para-nitrophenol, molten at 120° C., are added, while stirring, 45 parts of alpha-aminoanthraquinone and 18 parts of ethyl-dichloro-1.3.5.-triazine. A vigorous reaction begins at once. After about 1 hour, 500 parts of alcohol are run in, and the dyestuff, which separates, is filtered at ordinary temperature and washed with alcohol. From the orange colored alkaline hydrosulfite vat of the dyestuffs thus obtained cotton is dyed powerful yellow shades, exhibiting similar satisfactory properties as the dyeings obtained with the product of Example 10. The dyestuff contains most probably two radicals of alpha-aminoanthraquinone connected with the triazine ring.

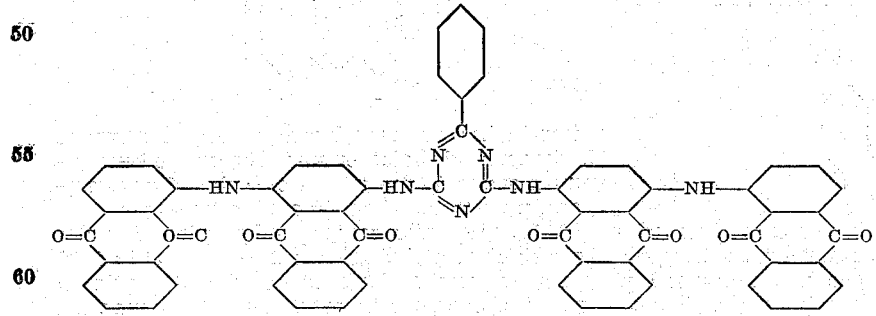

Example 13

68.4 parts of 1-amino-4-benzoylaminoanthraquinone are dissolved in 1000 parts of phenol at about 100° C. and 23 parts of cyclohexyldichloro-1.3.5-triazine are added. The reaction mixture is stirred for 3–4 hours at 100° C., whereupon about 1000 parts by weight of alcohol are run in slowly. 75 parts of a red condensation product, crystallized in small needles, separates out. With this dyestuff there are obtained from an alkaline hydrosulfite vat clear red dyeings, displaying very satisfactory fastness properties. The dyestuff contains most probably two radicals of 1-amino-4-benzoylaminoanthraquinone connected with the triazine ring.

*Example 14*

103 parts of 1-amino-5-benzoylaminoanthraquinone are dissolved in 2000 parts of phenol at 110° C., and 36 parts of benzyldichloro-1.3.5-triazine are added. A vigorous reaction begins immediately. The reaction mixture is stirred for 2 hours at 110° C., and about 1000 parts of alcohol are then run in slowly without interrupting the stirring. The dyestuff, thereupon, separates in beautiful golden yellow needles, which are isolated by filtering and washing with alcohol. The yield amounts to 115 parts (=90% of the theoretical). By means of this dyestuff cotton is dyed from an orange colored alkaline hydrosulfite vat beautiful golden orange shades, which display excellent fastness properties.

I claim:—

1. Process which comprises reacting upon a chlorinated 1.3.5-triazine compound of the formula:—

wherein $x$ means chlorine, alkyl or an aromatic, hydroaromatic or aliphatic-aromatic hydrocarbon radical of the benzene series, with an aminoanthraquinone compound in the presence of a compound of the group consisting of phenols and naphthols, which is inert to the starting materials under the conditions of the reaction.

2. Process which comprises reacting upon a chlorinated 1.3.5-triazine compound of the formula:—

wherein $x$ means chlorine, alkyl or an aromatic, hydro-aromatic or aliphatic aromatic hydrocarbon radical of the benzene series, with a compound of the formula:—

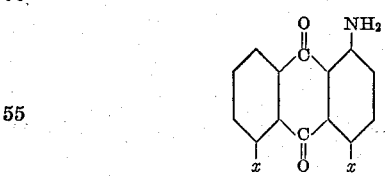

wherein the $x$'s means hydrogen or one $x$ means hydrogen and the other $x$ stands for the benzoylamino group, in the presence of a compound of the group consisting of phenols and naphthols, which is liquid at a temperature below about 100° C. and which is inert to the starting materials under the conditions of the reaction, at a temperature between about 60 and about 170° C.

3. Process which comprises reacting upon a chlorinated 1.3.5-triazine compound of the formula:—

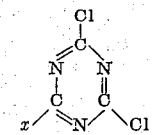

wherein $x$ means chlorine, alkyl or an aromatic hydro-aromatic or aliphatic-aromatic hydrocarbon radical of the benzene series, with a compound of the formula:—

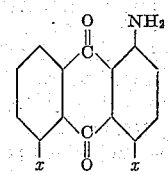

wherein the $x$'s mean hydrogen or one $x$ means hydrogen and the other $x$ stands for the benzoylamino group, in the presence of phenol at a temperature between about 60 and about 170° C.

4. Process which comprises reacting upon cyanuric chloride with a compound of the formula

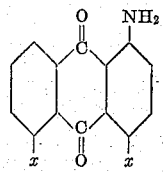

wherein the $x$'s mean hydrogen or one $x$ means hydrogen and the other $x$ stands for the benzoylamino group, in the presence of a compound of the group consisting of phenols and naphthols, said compound being liquid at a temperature below about 100° C., and being inert to the starting materials under the conditions of the reaction at a temperature between about 60 and about 170° C.

5. Process which comprises reacting upon cyanuric chloride with a compound of the formula

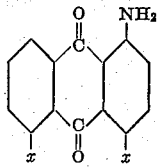

wherein the $x$'s mean hydrogen or one $x$ means hydrogen and the other $x$ stands for the benzoylamino group, in the presence of phenol at a temperature between about 60 and about 170° C.

6. Process which comprises dissolving 134 parts by weight of alpha-aminoanthraquinone in 2000 parts by weight of phenol, adding 37 parts by weight of cyanuric chloride, heating the reaction mixture to 110° C. for 5 hours and then 2-3 hours to 150° C., and precipitating the dyestuff formed, by means of pyridine.

FRANZ WIENERS.